Oct. 20, 1959     H. J. RIMBACH     2,908,990
TWIN WEEDLESS FISHHOOKS
Filed March 14, 1957
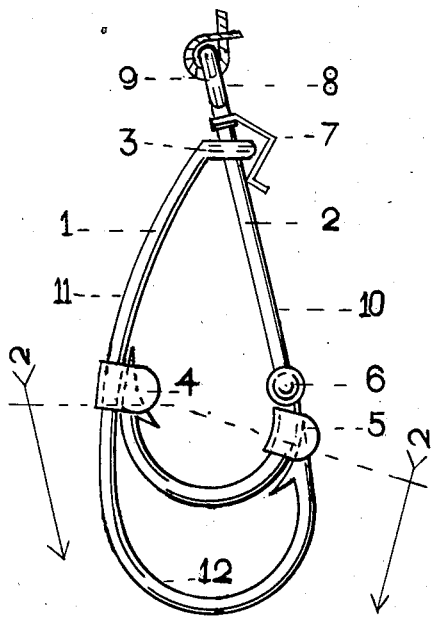
Fig-1-
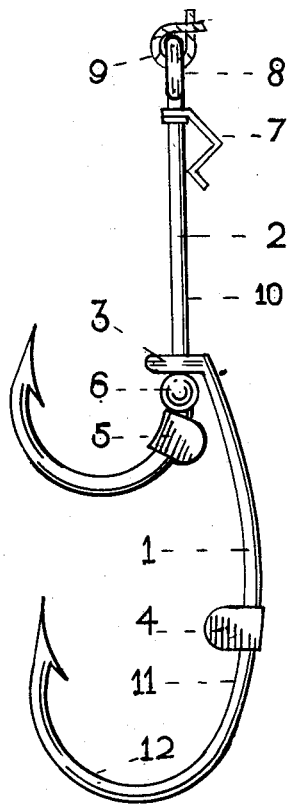
Fig-3-
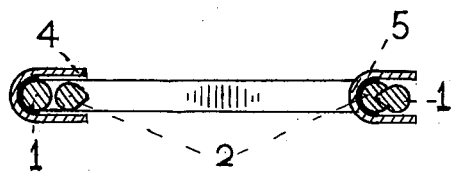
Fig-2-
Harry J. Rimbach
INVENTOR.

2,908,990
TWIN WEEDLESS FISHHOOKS

Harry J. Rimbach, Tavares, Fla.

Application March 14, 1957, Serial No. 645,936

5 Claims. (Cl. 43—44.82)

This invention relates to multiple, movable type hooks which are arranged and constructed so the points of the hooks are enclosed to obviate fouling by weeds or pads.

The object of the invention is to provide weedless fishhooks which may be used to cast or troll bait thru weeds and pads.

Another object of the invention is to provide a pair of fishhooks which are in the fish's mouth after the strike.

Another object of the invention is to provide fishhooks which may avoid sharp hook points when still fishing with live bait, the fish not feeling the points of the hooks will swallow the bait.

In using this fishhook structure, the auxiliary hook may be baited in the usual manner with a minnow, frog or eel, a line is fastened to the eye of the primary hook, the said hooks are then oppositely arranged, inserting points of said hooks in the shields of the opposite hook and are latched together by spring clip means. In this position the points of said hooks are enclosed in said shields to obviate fouling by weeds or pads. When the fish strikes, both hooks enter the fish's mouth, the line is jerked releasing said hooks from latched position in the fish's mouth.

This invention consists of a pair of hooks, a primary and an auxiliary hook, a line is fastened to the eye of the primary hook, the shank of the primary hook passes thru the eye of the auxiliary hook which is set at an angle to its shank, the hooks are oppositely held together by shields located on the shank of each hook and latched by spring clip means secured to the shank of the primary hook adjacent the eye thereof, a stop knob is located on the shank of the primary hook for stopping and limiting the relative sliding movement of said hooks after being released.

Fig. 1 is a side view of fishhooks latched together.

Fig. 2 is cross-section view taken on line 2—2 of Fig. 1.

Fig. 3 is side view of Fig. 1 with hooks released and points exposed, showing final position of hooks.

Referring more specifically to the drawings this invention consists of two hooks, a primary hook 2 and an auxiliary hook 1, with points, barbs, shanks and eyes. The line 9 is attached to the eye 8 of the primary hook 2, the shank 10 of said primary hook 2 being slidably received by the eye 3 of said auxiliary hook 1 to provide a pivotal and guiding connection between said primary 2 and auxiliary 1 hooks, said eye 3 of the auxiliary hook 1 which is set at an angle to its shank 11 for parallel sliding of said auxiliary hook 1. The shank 11 of the auxiliary hook 1 being elongated and curved with large lobe 12 which surrounds the lobe of the primary hook 2. The point of the primary hook 2 interlocking in the shield 4 attached to shank 11 of the auxiliary hook 1 facing inward. The point of the auxiliary hook 1 interlocking in the shield 5 attached to shank 10 of the primary hook 2 facing outward. In this position said primary hook 2 and said auxiliary hook 1 are latched together by sliding eye 3 of said auxiliary hook 1 which is pivotally and slidably attached to shank 10 of said primary hook 2 under spring clip means 7 which is secured to the shank 10 of the primary hook 2 adjacent to the eye 8 thereof, compressing on the eye 3 of the auxiliary hook 1. Spring clip means 7 is bent at an angle allowing said eye 3 to slide in and out of latched position. The stop knob 6 which is secured to shank 10 of the primary hook 2 adjacent and above shield 5 limits the relative sliding movement of said primary hook 2 and said auxiliary hook 1 after releasing said hooks from latched position.

Manifestly, the invention, as described is susceptible of modification without departing from the inventive concept, and the right is herewith reserved to such modifications as fall within the scope of the appended claims. Artificial bait or spoons may be adapted to the lobe of the auxiliary hook without departing from the spirit of the invention.

I claim as my invention:

1. A fishhook structure comprising a primary hook and an auxiliary hook, each of said hooks having an eye, shank, point and barb, said hooks being oppositely arranged, the eye of said primary hook being adapted to be connected to a line, the shank of the primary hook being slidably received by the eye of said auxiliary hook to provide a pivotal and guiding connection between said primary and auxiliary hooks, a pair of U-shaped shields, one shield being secured to the shank of each hook for interlocking the point of the opposite hook, a spring means connected to one of said hooks for latching said hooks in opposed relation and releasing said hooks from latched position when said line is jerked, and a knob for limiting the relative sliding movement of the primary and auxiliary hooks.

2. A fishhook structure comprising a primary and an auxiliary hook, each of said hooks having an eye, shank, point and barb, said hooks being oppositely arranged, the eye of said primary hook being adapted to be connected to a line, the shank of the primary hook being slidably received by the eye of said auxiliary hook to provide a pivotal and guiding connection between said primary and auxiliary hooks, said auxiliary hook eye being set at an angle to its shank for parallel sliding of said hook, a pair of U-shaped shields, one shield being secured to the shank of the auxiliary hook facing inward, the other shield being secured to the shank of the primary hook facing outward for interlocking the points of said opposite hooks, a spring means connected to one of said hooks for latching said hooks in opposed relation and releasing said hooks from latched position when said line is jerked, and a knob for limiting the relative sliding movement of the primary and auxiliary hooks.

3. A fishhook structure comprising a primary hook and an auxiliary hook, each of said hooks having an eye, shank, point and barb, said hooks being oppositely arranged, the eye of said primary hook being adapted to be connected to a line, the shank of the primary hook being slidably received by the eye of said auxiliary hook to provide a pivotal and guiding connection between said primary and auxiliary hooks, said auxiliary hook eye being set at an angle to its shank for parallel sliding of said hook, a pair of U-shaped shields, one shield being secured to the shank of the auxiliary hook facing inward, the other shield being secured to the shank of the primary hook facing outward for interlocking the points of said opposite hooks, a spring means secured to the shank adjacent to the eye of the primary hook for compressing on the eye of the auxiliary hook for latching said hooks in opposed relation and releasing said hooks from latched position when said line is jerked, and a knob for limiting the relative sliding movement of the primary and auxiliary hooks.

4. A fish hook structure comprising a primary hook and an auxiliary hook, each of said hooks having an eye, shank, point and barb, said hooks being oppositely arranged, the eye of said primary hook being adapted to be connected to a line, the shank of the primary hook being slidably received by the eye of said auxiliary hook to provide a pivotal and guiding connection between said primary and auxiliary hooks, said auxiliary hook eye being set at an angle to its shank for parallel sliding of said hook, a pair of U-shaped shields, one shield being secured to the shank of the auxiliary hook facing inward, the other shield being secured to the shank of the primary hook facing outward for interlocking the points of the opposite hooks, a spring means secured to the shank adjacent to the eye of the primary hook for compressing on the eye of the auxiliary hook for latching said hooks in opposed relation and releasing said hooks from latched position when said line is jerked, and a knob secured to the shank of the primary hook above and adjacent to the shield for limiting the relative sliding movement of the primary and auxiliary hooks after being released.

5. A fishhook structure comprising a primary hook and an auxiliary hook, each of said hooks having an eye, shank, point and barb, said hooks being oppositely arranged, the eye of said primary hook being adapted to be connected to a line, the shank of the primary hook being slidably received by the eye of said auxiliary hook to provide a pivotal and guiding connection between said primary and auxiliary hooks, a pair of U-shaped shields, one shield being secured to the shank of each hook for interlocking the point of the opposite hook, a spring means connected to one of the said hooks for latching said hooks in opposed relation, said auxiliary hook being adapted to be grasped by a fish, said line being adapted to be jerked for releasing said hooks from latched position, and a knob for limiting the relative sliding movement of the primary and auxiliary hooks.

References Cited in the file of this patent

UNITED STATES PATENTS 742,093   Henderson et al. _____ Oct. 20, 1903